United States Patent
Lindberg

(10) Patent No.: US 7,011,501 B2
(45) Date of Patent: Mar. 14, 2006

(54) ENERGY GENERATING SYSTEM

(75) Inventor: Björn Lindberg, Se-Soderala (SE)

(73) Assignee: Water Crossing, Inc., Sandarne (SE)

( * ) Notice: Subject to any disclaimer, the term of this patent is extended or adjusted under 35 U.S.C. 154(b) by 0 days.

(21) Appl. No.: 10/466,414

(22) PCT Filed: Jan. 17, 2002

(86) PCT No.: PCT/SE02/00078

§ 371 (c)(1),
(2), (4) Date: Oct. 28, 2003

(87) PCT Pub. No.: WO02/061273

PCT Pub. Date: Aug. 8, 2002

(65) Prior Publication Data

US 2004/0052634 A1  Mar. 18, 2004

(30) Foreign Application Priority Data

Jan. 17, 2001  (SE) .................... 0100141

(51) Int. Cl.
F03B 3/12 (2006.01)
F03B 3/14 (2006.01)
F03B 17/06 (2006.01)

(52) U.S. Cl. ............... 416/84; 416/85; 416/86; 416/188; 416/244 R; 416/244 A; 415/3.1; 415/7; 415/218.1; 290/53; 290/54

(58) Field of Classification Search ......... 415/3.1, 415/541, 141, 7, 1–4, 144, DIG. 1, DIG. 7, 415/4.3, 4.5, 218.1, 219.1, 220–223, 906, 415/908; 416/84–86, 11, 176 A, 188, 197 A, 416/176, 182, 244 R, 245 R, 245 A; 290/42–43, 290/53–54

See application file for complete search history.

(56) References Cited

U.S. PATENT DOCUMENTS

| 357,859 | A | * | 2/1887 | Ruble ................ 416/244 B |
| 3,176,960 | A | * | 4/1965 | Sproule ................ 415/141 |
| 3,790,304 | A | * | 2/1974 | Langlois ............... 416/245 A |
| 3,986,787 | A | * | 10/1976 | Mouton et al. ............ 415/7 |
| 4,025,220 | A | * | 5/1977 | Thompson et al. ......... 415/7 |
| 4,079,264 | A | * | 3/1978 | Cohen ................ 415/4.4 |
| 4,207,026 | A | * | 6/1980 | Kushto ................ 416/84 |
| 4,218,175 | A | * | 8/1980 | Carpenter ............ 415/219.1 |

(Continued)

FOREIGN PATENT DOCUMENTS

DE  4324110 A1  1/1995

(Continued)

Primary Examiner—Christopher Verdier
(74) Attorney, Agent, or Firm—Dickstein Shapiro Morin & Oshinsky LLP

(57) ABSTRACT

A system (1) designed to generate energy with the aid of, primarily, sea currents, comprising a rotation body (4) having a front inlet side (2) and a rear outlet side (3), and at least one transfer member (6) connected between the inlet side (2) and a generator (5). The rotation body has a conical and/or bulb shaped, tapering section (8, 9) extending from a substantially cylindrical waist section (7) in direction towards the inlet side, and a conical and/or concave or flat portion extending in the opposite direction from the outlet side, said waist section being along its circumference provided with close to each other mounted blades (10) for the purpose of maintaining a rotation of the rotation body, the free, front end of which is at the same time secured to the transfer member (6) in order to transfer a rotational movement to the generator (5).

7 Claims, 5 Drawing Sheets

U.S. PATENT DOCUMENTS

Figure 3:
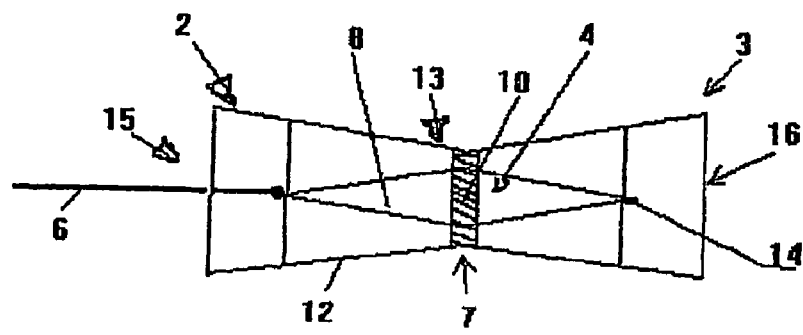

| | | | | |
|---|---|---|---|---|
| 4,258,271 A | * | 3/1981 | Chappell et al. | 415/906 |
| 4,313,059 A | * | 1/1982 | Howard | 290/54 |
| 4,722,665 A | * | 2/1988 | Tyson | 416/84 |
| 4,748,808 A | * | 6/1988 | Hill | 60/398 |
| 4,832,571 A | * | 5/1989 | Carrol | 416/132 B |
| 4,849,647 A | * | 7/1989 | McKenzie | 290/54 |
| 4,868,408 A | * | 9/1989 | Hesh | 415/3.1 |
| 6,109,863 A | * | 8/2000 | Milliken | 415/1 |

FOREIGN PATENT DOCUMENTS

| | | |
|---|---|---|
| GB | 2348249 A | 9/2000 |
| JP | 57-206779 A | 12/1982 |

* cited by examiner

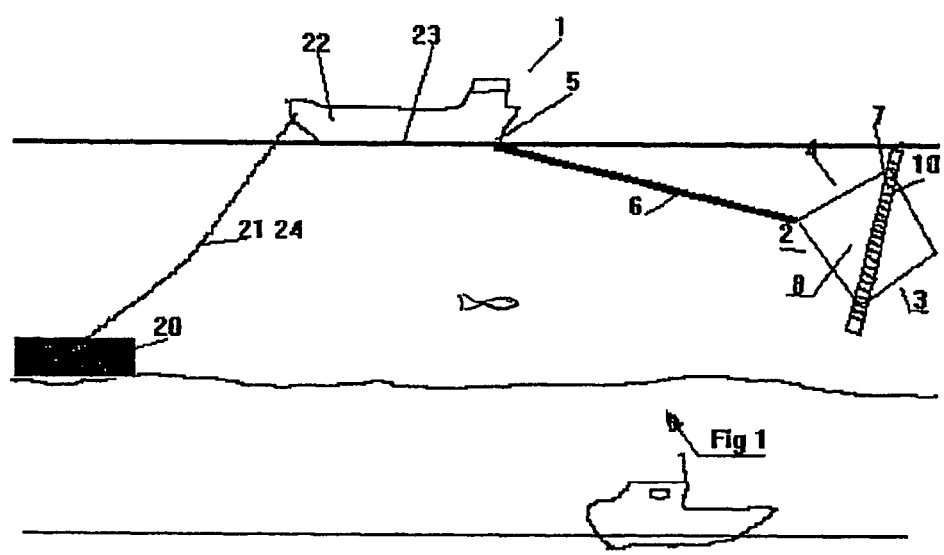
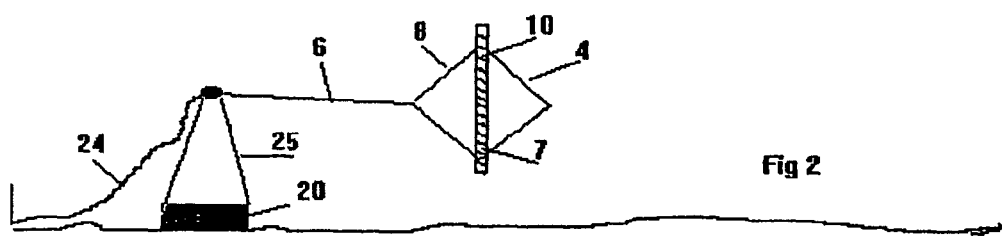
Fig 1
Fig 2

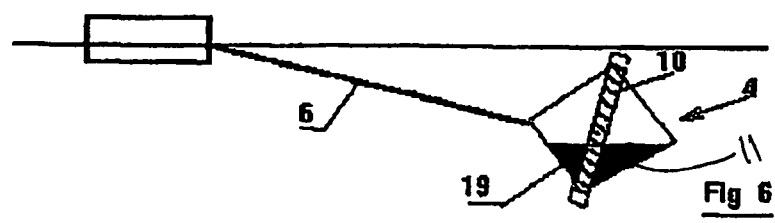
Fig 6
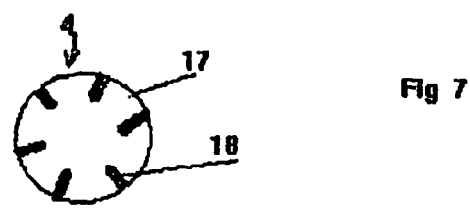
Fig 7
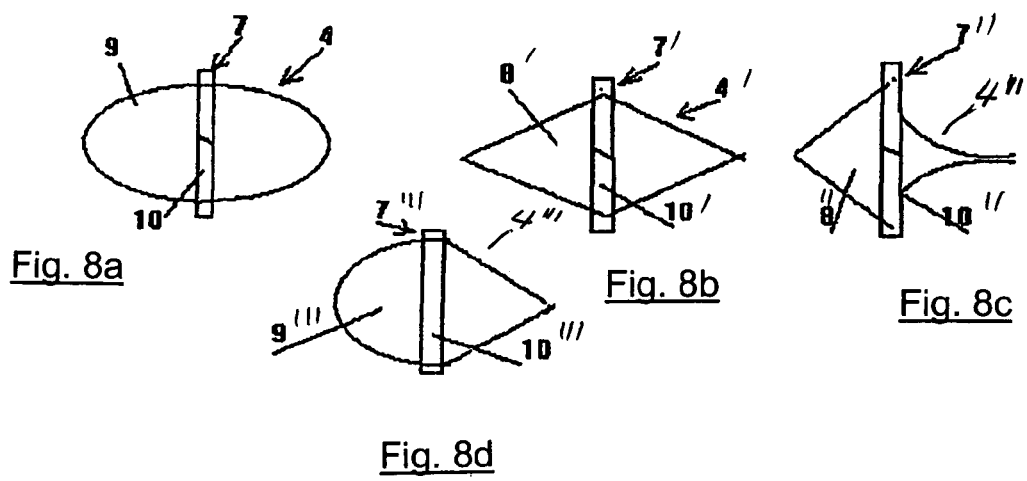
Fig. 8a
Fig. 8b
Fig. 8c
Fig. 8d

ENERGY GENERATING SYSTEM

The present invention relates to a system for generating energy, primarily with the aid of sea currents, and comprising a rotation body having a front inlet side and a rear outlet side, and at least one transfer member connecting the inlet side with the generator.

The prior art methods and systems intended to generate energy with the aid of i.e. sea water have turned out to require high costs. Also, their efficiency has been low inter alias because the energy generated with use of those systems has often been insufficient with regard to the investment costs.

The object of the present invention is to establish a system for generating energy with the aid of, primarily, sea water current. It comprises a rotation body allowing production of significantly more energy than the amount previously possible to create. Thanks to the flexibility of this system it can be located in such places in the sea where the sea currents are strongest. The features characterizing the invention are set out in the claims.

Thanks to the invention there has now been provided a system which in an excellent way satisfies the purposes. Also, it can be manufactured conveniently and at a relatively low cost. According to the invention the system comprises a rotation body which constitutes the core of the invention and which is brought to rotate by the sea currents in which the system is localized.

The rotation of the rotation body can be optimized by adjustment of the angles of the blades which are oriented around the waist portion of the rotation body. The rotation body is retained in its level in the sea with the aid of transfer members which also transfer the rotation movement to a generator. Due to the special shape of the rotation body very high efficiency is obtained relating to the conversion of slow flows consisting of a large water volume. The transfer of the rotation of energy from the rotation body takes place by means of the transfer member to a generator, either for direct transfer of generated electric energy or for storing of that energy. The system includes a pump or a compressor which keeps the rotation body in the correct power generation position in combination with the blades on the circumference of the body. Said pump or compressor is used to adjust the degree to which the rotation body is filled with i.e. water which does per se influence the rotation position of the body in the sea. In order to eliminate the friction of the fluid which is inside the rotation body and determine its filling degree the inner side of the rotation body is provided with internally oriented blades which cause the fluid inside to rotate together with the rotation body instead of creating a friction against its inner walls. This arrangement means that the blades do also function as ribs making all of the rotation body more rigid.

Some preferred embodiments of the invention are described below with reference to the drawings.

Figure 4:
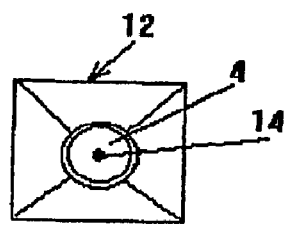
Figure 5:
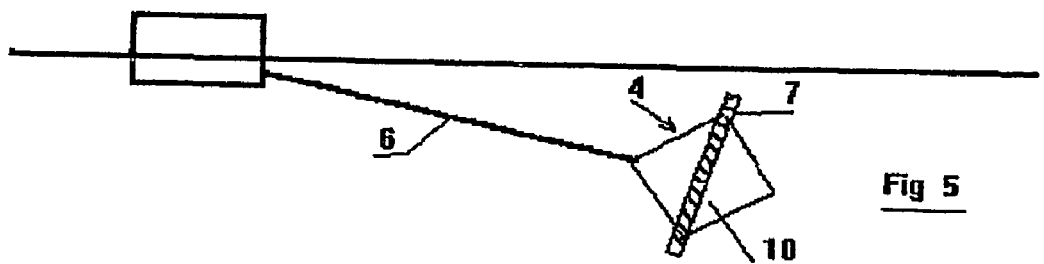
Figures 9A, 9B, 9C, 9D:
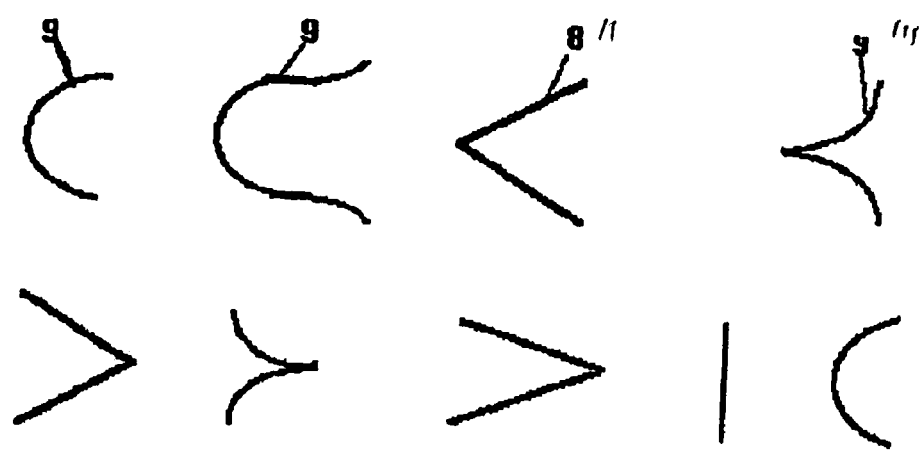
Figure 10:
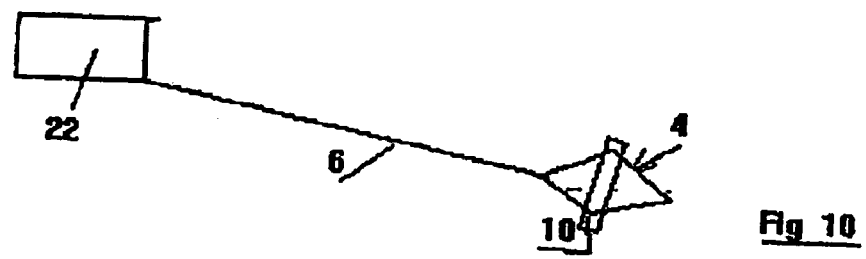
Figure 11:
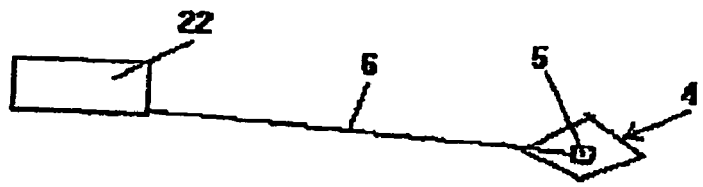
Figure 12:
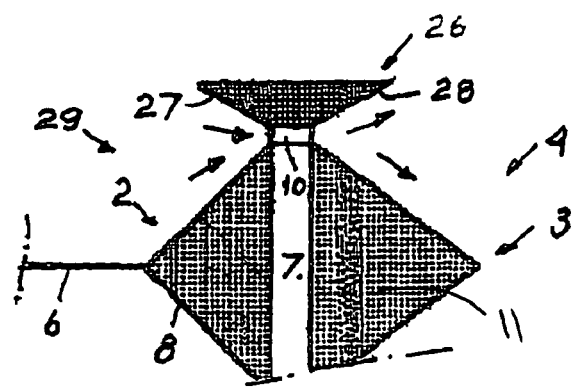
Figure 13:
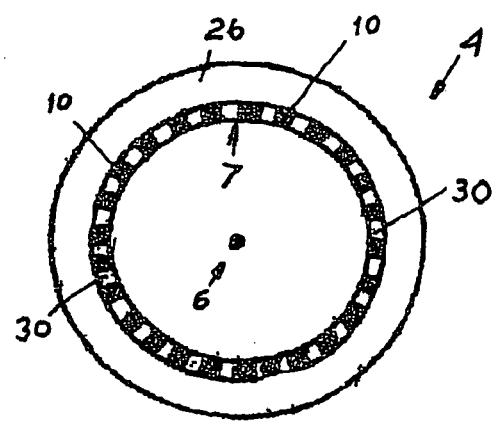
Figure 14:
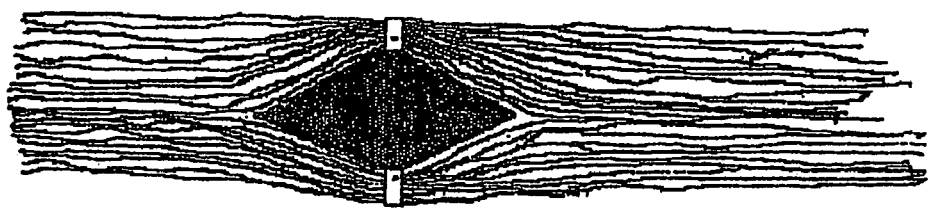

FIG. 1 is a diagrammatic lateral view showing a system according to the present invention, FIG. 2 illustrates an alternative way to use the system according to the invention, FIG. 3 is a diagrammatic, cross sectional lateral view showing a rotation body included in the system according to the invention and rotationally supported inside a nozzle-like, surrounding casing, FIG. 4 is an end view of the rotation body and its casing according to FIG. 3, FIG. 5 is a diagrammatic lateral view of another embodiment of the invention showing a rotation body having a front inlet side with a conical portion and an outlet side with a flat portion, FIG. 6 is a diagrammatic view showing a rotation body included in the system and illustrating how the height position of the rotation body can be varied by variation of the filling degree of the rotation body, FIG. 7 is a cross sectional view through the waist portion as seen towards its inlet side and illustrating the internal blades, FIG. 8a–8d illustrate different designs of the inlet and outlet sides of the rotation body, also showing the axial and radial location of the blades at the waist portion of the body, FIG. 9a–9d illustrate possible designs of the water inlet and outlet side, respectively, FIG. 10 is a diagrammatic lateral view showing a pivotably transferring member for the rotating movement, which eliminates the influence of the wave movements, FIG. 11 shows a rigid, radial force transfer with the aid of a transfer member including a pivotably coupling and a current and an electric current generator mounted inside the body, the transfer member being constituted by a rigid transfer shaft, FIG. 12 is a lateral view showing another embodiment according to which the rotation body does around its waist portion exhibit a truncated conical body, the oblique lateral surfaces which converge towards the waist portion and emerge therein via blades or wings around the waist portion which are located at a predetermined distance from each other, FIG. 13 is an end view of the rotation body showed in FIG. 12, FIG. 14 does diagrammatically show a rotation body according to the invention and illustrates how the currents are concentrated.

As appears from the drawing figures the invention is constituted by a system 1 for producing energy with the aid of, primarily, sea currents and comprising a rotation body 4 having a front inlet side 2 and a rear outlet side 3 as well as at least one transfer member 6 connecting the inlet side 2 with a generator 5. The transfer member 6 can be constituted by either a flexible or a rigid shaft.

The rotation body 4 (or 4', 4", 4''') exhibits a tapered portion 8 (or 8', 8", 8''') extending from a substantially cylindrical waist portion 7 (or 7', 7", 7''') towards the inlet side 2 and being conical and/or bulb-shaped. The different shapes of the rotation body 4 (or 4', 4", 4''') at the inlet side 2 and at the outlet side 3, respectively, are shown more in detail in FIGS. 8a–8d and 9a–9d. The bulb shape, the tunnel shape, as well as the axial and radial location of the blades making the body 4 (or 4', 4", 4''') rotate are designed to match the factors determined by the average flow, the average temperature and the salt content and which have been individually calculated for each selected mounting position. At the rotation body 4 (or 4', 4", 4''') the streams are concentrated to its outer diameter after which they converge to their original shape. For that reason the blade height is calculated in consideration of that fact. Suitable outlet shapes of the rotation body 4 (or 4', 4", 4''') are shown in FIGS. 8a–8d and 9a–9d. The shapes have been selected to create a maximum efficiency in order to match the combined influence of different density, salt content and current flow speed variations.

The rotation body 4 does around its waist portion 7 exhibit blades 10 interspaced at different distances and functioning to maintain the rotation of the rotation body. The free, front end of the rotation body 4 is connected to the transfer member 6 for the purpose of transferring a rotation movement to the generator 5. The blades 10 can have adjustable attack angles so that they can be turned to yield the highest possible output power.

According to an alternative embodiment, more in detail shown in FIGS. 12 and 13, the waist portion 7 of the rotation body exhibits a truncated, conical body 26 supported by blades or wings 10. Its converging sides 27, 28 are facing the waist portion 7 so as to create a tunnel-like formation 29 catching the sea currents and directing towards the blades 10 through the intermediate bases 30. According to the preferred embodiment the mounting angle of the blades 10 can be about 45°. The power obtainable thanks to the rotation of the rotation body can in that case be increased by about 30%.

For the orientation of the rotation body 4 in the sea the latter comprises a fluid supply member 11, consisting of e.g. a pump or a compressor, which keeps the body in the correct power-consuming position in combination with the above mentioned possibilities to vary the blade angle at the intensity of the sea currents. In order further to increase the effectiveness of the rotation body the latter can be mounted in a nozzle-like casing 12 which could be shaped like a hour-glass and the walls of which diverge from the tapered center section 13 of the casing in which the rotation body is rotatably supported in bearings 14 which are secured to the inlet 15 and the outlet 16, respectively, of the casing 12. According to the embodiment shown casing 12 has a square cross section providing a larger area as compared with a circular cross section and, consequently, a maximum flow speed which in its turn to the rotation body 4 imparts the highest possible rotation movement.

The external wall 17 of the rotation body 4 does on its inner surface have blades 18 around the circumference for the purpose of eliminating the friction generated by a fluid, for example water, which is present inside the rotation body 4. At the same time blades 18 serve as ribs which make the outer wall 17 of the rotation body 4 stiffer. Thanks to this arrangement the water filling up the interior of the rotation body 4 will participate in the rotation movement.

FIG. 1 illustrates how a system 1 according to the invention can be designed. In this case system 1 comprises an anchor member 20 which is resting on the sea bottom and from which extends a chain 21 connected to a float member 22 which in its turn supports an accumulator 23 for the purpose of storing energy from the rotation body 4 via the transfer member 6 and the generator 5. Connected to the float member 22 is also a cable 24 which when desired can be used to transport energy to the shore. Another possibility is to transfer the energy stored in the accumulator 23 to different types of collection ships for continued transport of the stored energy to the desired destination.

FIG. 2 does diagrammatically show a system 1 according to the invention in which the rotation body 4 is supported in a sea current with the aid of an anchoring member 20 provided with a frame 25. The latter helps to keep the rotation body 4 in a predetermined position in the sea current. The transfer member is pivotably connected to frame 25 to which is also connected a cable 24 for the purpose of transporting energy to land.

FIGS. 10 and 11 do in the system 1 according to the invention illustrate different connections between the rotation bodies 4 and the float members 22. FIG. 10 illustrates an articulated power transfer which eliminates influence from the sea waves. FIG. 11 illustrates a stiff radial connection including an articulated coupling and an electric current generator 5 installed inside the rotation body 4. There is also a cable which transports the energy generated in the generator 5 through the transfer member 6, in this case constituted by a rigid shaft.

The difference structures above described have made it possible to create a system including a rotation body the circumferential speed of which can be increased radially. The low flow and the great amount of water can be concentrated to an added force at the circumference.

FIG. 14 does diagrammatically show how the streams get concentrated to the outer diameter of the rotation body 4, especially in the waist portion 7 area. Following this the streams are again united to their original shape. For that reason the blade size has been calculated to match exactly this fact and there has been attained an efficiency corresponding to about 16 kW/m$^2$ which is four times more than according to the prior art solutions.

What is claimed is:

1. System (1) for generating energy, primarily with the use of sea currents, comprising a rotation body (4) having a front inlet side (2) and a rear outlet side (3), and at least one transfer member (6) between the inlet side (2) and a generator (5), wherein said rotation body has a conical and/or concave section extending in a direction toward the outlet side as well as a conically and/or bulb shaped tapering portion (8, 9) extending from a substantially cylindrical waist portion (7) towards the inlet side, wherein the waist portion is provided with turbine blades (10) only along its circumference that are adapted to maintain the rotation of the rotation body, a free front end of which is secured to the transfer member (6) to transfer a rotational movement to the generator (5), and wherein an inner surface of an outer wall (17) of the rotation body (4) exhibits blades (18) along its circumference for the purpose of eliminating friction generated by a fluid (19) inside the rotation body.

2. System according to claim 1, characterized in that the incidence angles of the turbine blades (10) are variable.

3. System according to claim 1, characterized in that the rotation body (4) comprises a fluid supply member (11) adapted to keep the body in a correct float position in response to the intensity of the sea currents.

4. System according to claim 1, characterized in that the rotation body (4) is located inside a nozzle-like casing (12) having a substantially hour-glass form, its walls diverging from the tapered central section (13) of the casing (12) in which the rotation body (4) is rotatably mounted.

5. System according to claim 3, characterized in that a casing has a square cross section.

6. System according to claim 1, characterized in that said blades (18) further serve as ribs for the purpose of stiffening up the outer wall (17).

7. System according to claim 1, characterized in that the waist portion (7) of the rotation body (4) exhibits a truncated, conical body (26) supported by the turbine blades (10) and extending around the waist portion, the converging sides (27, 28) of said conical body facing the waist portion (7) to form a tunnel formation (29) defined by the tapering portion (8, 9) of the rotation body and by the front side (27) of the truncated body (26) and narrowing towards the turbine blades (10) and between existing intermediate spaces (30) between said turbine blades (10) for the purpose of collecting and directing the sea currents.

* * * * *